United States Patent
Luneau et al.

[11] Patent Number: 5,848,161
[45] Date of Patent: Dec. 8, 1998

[54] METHOD FOR PROVIDING SECURED COMMERICAL TRANSACTIONS VIA A NETWORKED COMMUNICATIONS SYSTEM

[76] Inventors: Greg Luneau, Unit 603-110 Adamar Road, Winnipeg, MB, Canada, R3T 3M3; Jason Remillard, #8-100 Wickham Road, Winnipeg, MB, Canada, R2J 2L4; Thomas King, 637 W. Sunset Dr., Villa Park, Ill. 60181-1416

[21] Appl. No.: 648,876

[22] Filed: May 16, 1996

[51] Int. Cl.$^6$ ........................................... H04L 9/00
[52] U.S. Cl. ................................. 380/49; 380/24
[58] Field of Search .......................... 380/23, 24, 25, 380/28, 30, 29, 49

[56] References Cited

U.S. PATENT DOCUMENTS

| | | | |
|---|---|---|---|
| 5,557,518 | 9/1996 | Rosen | 380/24 |
| 5,671,279 | 9/1997 | Elgamal | 380/24 |
| 5,673,316 | 9/1997 | Auerbach et al. | 380/25 |

OTHER PUBLICATIONS

"Doing Business on The Net", May 14, 1996 San Diego Tribune, Computer Link Section.
Tsudik, "Datagram Authentication in Internet Gateways:" III Journal on Selected Areas of Communication v7 n4, May 1989.
"Secure Electronic Tranaction Specification", Feb. 23, 1996 Mastercard/Visa.
"PGP Means Business", Jan. 1, 1996, Viacrypt.
"CyberCash Investors See Dollar Signs", Feb. 16, 1996 USA Today, p. 3B.

*Primary Examiner*—David Cain
*Attorney, Agent, or Firm*—Patnaude Videbeck & Marsh

[57] ABSTRACT

In a networked communications system comprising a client unit, a secured host server, and a company subscriber unit, a method for providing secured commercial transactions via the networked communications system. The method includes the steps of providing a secured transmission path via the networked communications system between the client unit and the secured host server, presenting the client unit with an order form in which commercial information is to be entered via the secured transmission path, receiving the commercial information transmitted via the secured transmission path by the client unit at the secured host server, maintaining the commercial information solely in the dynamic memory of the secured host server, encrypting the commercial information in response to the step of receiving the commercial information, erasing the dynamic memory of the secured host server in response to the step of encrypting the commercial information, and forwarding the encrypted commercial information via the communications network from the secured host server to the company subscriber unit.

8 Claims, 1 Drawing Sheet

METHOD FOR PROVIDING SECURED COMMERICAL TRANSACTIONS VIA A NETWORKED COMMUNICATIONS SYSTEM

BACKGROUND OF THE INVENTION

This invention relates generally to networked communications systems and, more particularly, relates to a method for providing secured commercial transactions between a client unit and a company subscriber unit via a global network known as the "Internet".

Currently, there are three major Secure Electronic Transaction (SET) payment schemes which have been developed and implemented. Each of these schemes utilizes cryptography for the purpose of providing confidentiality of information, ensuring payment integrity, and authenticating both merchants and cardholders. These security criteria are provided in hopes of enabling greater bank card acceptance combined with a level of security that will encourage consumers and businesses to make wide use of bank card products in this emerging market. In particular, the three SET payment schemes can be classified as follows: payment schemes using encrypted data; payment schemes using third parties; and payments using digital cash. A brief explanation and implementation examples of each payment scheme follow.

Payments Using Encrypted Data

With this payment scheme, credit card details are encrypted before they are transmitted to the merchant. The leading protocols used to establish the three security criteria above-described are secured sockets layer "SSL" and Secure HTTP "S-HTTP" which have been designed by RSA Data Security Inc. for Netscape and Enterprise Integration Technologies for NCSA Mosaic respectively. These two protocols are parallel security protocols. (Recently, a decision was announced by Netscape that both of these protocols would become integrated since they are deemed complementary.) Specifically, SSL provides the encryption necessary to route data to the merchants server while the S-HTTP protocol provides for security at the server itself.

In particular, these protocols both use public-key encryption to provide secure links. Public-key encryption uses a pair of keys whereby messages encoded by one key can only be decoded by the other key of that pair, and vice versa. Every working party has a unique set of keys where one key is kept secret and the other key is made public. This differs from secret-key encryption which utilizes one and the same key for encoding and decoding.

By way of example, public-key encryption generally works as follows: for authentication, a party encrypts with a secret key; verification is provided by decoding using the parties public key; and for private communication, the sending party encrypts using the other party's public key.

For examples of this payment scheme implemented, see The Netscape Galleria.

While this scheme is advantageous since the application is transparent to the end-user and it provides enhanced security, it nevertheless suffers the disadvantages of relying on codes that can be theoretically broken and is costly to implement in terms of added equipment and overhead. Furthermore, while it is believed that this is the best alternative available to date since the SSL compliant server offers the easiest and most transparent solution to consumers, this scheme does not address the needs of a remote company subscriber. Specifically, this scheme fails to provide a complete and secure solution for a company subscriber without a server on the premises.

Payments using third parties

For payment schemes involving third parties, a company collects and approves all payments from one client to another. All the information necessary for the transaction is collected via the Internet except for the confidential credit card number data. Specifically, the credit card number data is transmitted via a secure telephone line and the information is kept on a secure computer that cannot be accessed from the Internet. (The third party makes money by charging the merchant and consumer for services much in the same way as conventional credit card companies make money.)

For an example of this payment scheme implemented, see First Virtual, NetChex, and the NetBill Project.

While this scheme is simple, safe and highly secure without requiring the use of complicated encryption techniques, there are seen to be a number of disadvantages. In particular, this scheme suffers the disadvantages of adding the cost of third-party services, allowing spending limits to be reached without the knowledge of the consumer since money is linked to a credit card, and the potential loss of privacy since all data is gathered in a centralized system. Furthermore, problems utilizing this scheme also result from the need to manage shipping costs, backorders, delayed shipments, and billing problems arising from the involvement of the third party.

OPEN MARKETS, offers another alternative for providing the merchant with the customer order via a highly developed and dedicated secure server. Specifically, credit card information is handled by OPEN MARKETS, through a dedicated "back-end" server hosted by OPEN MARKETS, which is linked by dedicated phone lines to a financial institution. The credit card information is not processed until OPEN MARKETS is notified by the retailer, via regular e-mail or phone, that the order has been shipped. At that time OPEN MARKETS processes the credit card information for the retailer. However, this scheme also suffers from many of the disadvantageous above-described.

Payments Using Digital Cash

This scheme uses a third party as well but differs significantly from the previously described third party scheme. In the previous third party payment scheme, the third party was analogous to the post office. In the digital cash scheme, the third party acts as a virtual bank that provides "digital coins" to the consumer. In particular, money is deposited via a credit card over secure telephone lines or mailed in the form of a check to the virtual bank in the same manner as a conventional bank account. The consumer can then withdraw the digital coins from their Internet bank account and store them on the hard drive. When a purchase is made, the money is withdrawn from the hard drive and transmitted to the merchant or another party. Smartcards can also be used to store digital coins allowing cash to be carried. The scheme of providing security for the digital coins is again RSA public-key encryption.

Specifically, when utilizing this scheme to make withdrawals from the virtual bank, the consumers PC determines the equivalent digital coin amount required by the user and produces a random serial number representative of said amount. Thereafter, the serial number is "blinded" using RSA public-key cryptography to insure privacy. The bank encodes the serial numbers with its own secret key (digital signature) and debits the consumers account. The digital coins are then sent back to the user and decoded using the banks public key for storage on the consumers PC. To spend the digital coins, the PC collects the amount of coins necessary to reach the requested total value of the transaction which coins are sent to the receiver. The receiver then sends the coins directly to the digital bank where the bank verifies the validity of the digital coins and credits the account of the receiver.

For an example of this payment scheme implemented, see CyberCash, Digicash, and Net Bank.

While this scheme has the advantages of providing anonymity for the consumer, quickness, and working much on the same familiar principle as cash, this scheme nevertheless suffers the disadvantage of being complicated. In addition, hardware failure can mean loss of money. As a result, this scheme has not gained widespread support from banks and merchants.

A variation to this scheme would be CYBERCASH's "wallet" software. CYBERCASH provides a method for allowing subscribers on a networked communications system to transfer commercial information to a company subscriber in a secured manner. In particular, CYBERCASH requires a subscriber "wallet" which is a piece of software that must be downloaded or otherwise locally installed on the subscriber unit before any commercial transactions may occur. The subscriber then must utilize the "wallet" software to encrypt, specifically PGP encrypt, any information that the subscriber wishes to maintain as secure. This encrypted information is then transferred to a designated server and accordingly forwarded to the company subscriber and CYBERCASH for description. The financial institution is linked via a dedicated phone line to CYBERCASH. The credit card transaction is approved and that data is reencrypted and returned to the subscriber and the company subscriber. The basic drawback to this scheme is primarily the additional software required by the consumer and a complicated back-end system that incorporates a third party, CYBERCASH and a bank, plus several back-and-forth transactions all resulting in numerous file structures. This scheme suffers the further disadvantage of requiring the user to have specialized programming resident on the user's subscriber unit.

From the foregoing description of available secured commercial transaction methods, it is seen that a need exists for an improved method of providing secured commercial transactions via a networked communications system.

As a result of this existing need, it is an object of the present invention to provide a method of providing secured commercial transactions via a networked communications system in which consumers will have confidence.

It is a further object of the invention to provide a method that is easy, attractive, and transparent to consumers when utilized.

It is yet another object of the present invention to ensure that no residue of the commercial transaction is available to authorized network subscribers.

It is still a further object of the present invention to provide a service in which company subscribers can receive secured commercial information in a cost effective manner.

SUMMARY OF THE INVENTION

In accordance with the present invention, a method for providing secured commercial transactions in a networked communications system comprising a client unit, a secured host server, and a company subscriber unit is provided. Generally, the method includes the steps of providing a secured transmission path via the networked communications system between the client unit and the secured host server, receiving encrypted commercial information transmitted via the secured transmission path by the client unit at the secured host server, reencrypting the once encrypted commercial information in response to the step of receiving encrypted commercial information, and forwarding the reencrypted commercial information via the communications network from the secured host server to the company subscriber unit.

More specifically, the method includes the steps of providing a secured transmission path via the networked communications system between the client unit and the secured host server, presenting the client unit with an order form in which commercial information is to be entered via the secured transmission path, receiving the commercial information transmitted via the secured transmission path by the client unit at the secured host server, maintaining the commercial information solely in the dynamic memory of the secured host server, encrypting the commercial information in response to the step of receiving the commercial information, erasing the dynamic memory of the secured host server in response to the step of encrypting the commercial information, and forwarding the encrypted commercial information via the communications network from the secured host server to the company subscriber unit.

A better understanding of the objects, advantages, features, properties and relationships of the invention will be obtained from the following detailed description and accompanying drawing that sets forth an illustrative embodiment and is indicative of the various ways in which the principles of the invention may be employed.

BRIEF DESCRIPTION OF THE DRAWINGS

For a better understanding of the invention, reference may be had to FIG. 1 which illustrates a communications network on which the subject invention resides.

DETAILED DESCRIPTION

Figure 1:
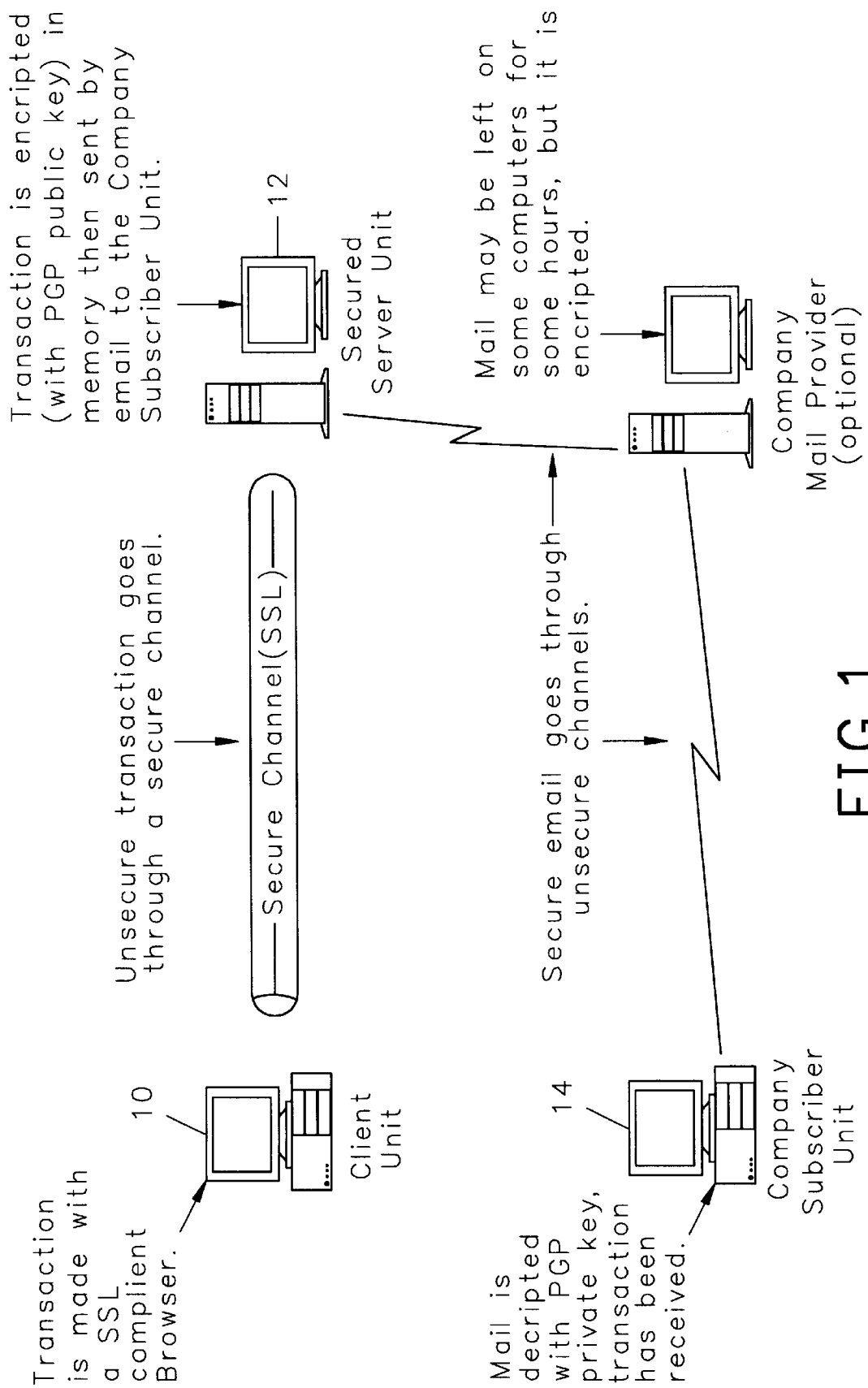

With reference to the figures and Appendix A, a method for providing secured commercial transactions via a networked communications system is disclosed. As will be readily understood by one skilled in the art, the system on which the method resides generally comprises a communications network, such as the internet, which has attached thereto a client unit 10, a secured host server 12, and a company subscriber unit 14. The client unit 10 is preferably a personal computer equipped with appropriate access software such as MICROSOFT EXPLORER, version 2.0+, and NETSCAPE NAVIGATOR, version 1.2+. The secured host server 12 is preferably a NETSCAPE commerce server that utilizes a 128-bit, non-export encryption key that corresponds to the DES standard (UPS Military grade security). The DES keys may be obtained from RSA Data Technologies. It will also be understood that the product or services available to the client will be "advertised" on the communications network by a company subscriber making available an unsecured HTML document which may be part of a local network or remote from the company subscriber unit.

To initiate the ordering of a product or service off the web, the client unit first establishes a Secure Sockets Layer (SSL) session utilizing the above-mentioned access software which transfers the link from an unsecured first server to the secured host server. Thereafter, once the two way, secured, SSL communications link is established between the client unit and the secured host server, the client automatically authenticates the connection via the entering of predetermined certificate keys. This authentication code is passed and confirmed between the client and the secured host server. In this manner, any information passed between the two devices is transferred in a secure, encrypted manner via DES grade encryption.

Once the secure connection has been established via the SSL, the secured host server presents the client unit with an order form to be displayed thereon, typically created in Hypertext Markup Language (HTML), which includes various information fields which the user must complete in order to proceed with the commercial transaction. It is contemplated that among these various information fields will be a field that will require the user to enter personal details, credit card information, and a list of the products/services that are desired. After the pertinent information has been entered into the order form, the user causes the information to be transmitted from the client unit to the secured host server. More specifically, the information entered into the information fields of the order form is sent directly to the port and process currently running on the secured host server via the SSL.

In response to the receipt of the information that has been entered into the order form by the client, the secured host server causes the running of a separate sessions program that takes the information submitted thereto and immediately encrypts it with the company subscriber unit PGP public key. More specifically, the information transmitted from the subscriber unit is first and automatically turned into an ASCII text format by the software resident on the secured host server and then "piped" by a perl script to the PGP program and encrypted. It is preferred that each transaction spawn its own individual, separate session. Furthermore, during the PGP encryption process, the information received from the client unit is prevented from being written to disk or otherwise stored or transmitted anywhere on the local network to which the secured host server may be attached. Accordingly, the information received from the client is processed only in the high or dynamic random access memory (RAM) of the secured host server upon its receipt. Once the information has been encrypted utilizing the company subscriber unit PGP public key, the dynamic memory of the secured host server that contains the information transmitted via the SSL is erased or otherwise overwritten.

It will be appreciated by those skilled in the art that this process of PGP encrypting occurs in nanoseconds. Accordingly, the information transferred via the SSL from the client unit to the secured host server never resides on the secured host server for any significant duration of time. In this manner, the information transferred via the SSL is, for all practical purposes, never resident on the communications network or secured host server where said information would be capable of being accessed by a hacker or any other unauthorized network user.

Once the information has been encrypted utilizing the company subscriber unit PGP public key, the company subscriber unit is notified of the transaction and the PGP encrypted information is transferred thereto for processing. The transfer of the PGP encrypted information is preferably accomplished through sending the PGP encrypted information to the company subscriber unit via electronic-mail or the like. Additionally, at the close of the perl script, it is preferred that an acknowledgment be automatically generated in the form of an unencrypted e-mail and returned to the client unit. This acknowledgement should include a copy of the order minus the credit card data and other data the company subscriber feels need not be transmitted. While not necessary, local copies of the PGP encrypted information may also be submitted to a special, unannounced server that is provided as a simple backup. An unannounced server is equipped with a one-way gate and any information stored therein is inaccessible by third parties connected to the network.

Once the company subscriber has downloaded the PGP encrypted information, any residue thereof which may reside on the E-mail server will be overwritten during the normal course of its operation. At this point, an authorized agent of the company subscriber will authenticate the PGP encrypted e-mail and, thereafter, take the PGP encrypted information and run it through a decryption program provided by the operator of the secured host server. Any tampering of the PGP secured transaction will be noticeable in the authentication process. (See the documents attached to Appendix A showing the PGP encrypted order (1) and the decrypted order (2) noting the date, time, and invoice number stamps on both the decrypted order (2) and the subscriber acknowledgment (3)).

The decryption program will require the company subscriber unit's private key and key phrase to confirm and continue the decryption process. If the appropriate key-generated key code is submitted, the PGP encrypted information is decrypted and the company subscriber may thereafter process the information in its regular course of business. From the preceding description, it will be apparent that the invention overcomes the problems associated with the prior art in that there is no residual, centralized file structure which is exposed to attack, the management of billing issues resides with the retail subscriber, the operating costs are reduced, and the encryption scheme is transparent to the consumer and the retailer. Furthermore, since the retailer receives the private key while the operator of the secured host server maintains the public key, transactions are even secure from the operator of the secured host server. In sum, the described invention has the advantages of providing a user friendly, user transparent, and highly secure method of performing commercial transactions via a communications network.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention that is to be given the full breadth of the appended claims and any equivalent thereof.

APPENDIX A

The following perl script is utilized to encrypt and mail, by PGPMAIL, information submitted using a CGI form script.

```
#!/usr/bin/perl
#Gregory Luneau, Greg@Solutions.Net
#Copyright (c) 1995, 1996
#Process the input from POST method of the HTML page.
$buffer = <STDIN>;
```

APPENDIX A-continued

```
@pairs = split(/&/,$buffer);
foreach $pair (@pairs)

{
($tag, $value) = split(/=/, $pair);
$value =~tr/+//;
$value =~s/%([a-fA-F0-9] [a-fA-F0-9])/pack("C", hex($1))/eg;
$FORM{$tag} = $value;
}

#Tells the PGP program where the public key chain is.
$ENV{"PGPPATH"} = "/html/company/.pgp/";
#This will encript everything sent to PGPMAIL with PGP,
#and then Mail it to the Company Subscriber Unit with Mail.
local($pid) =open(PGPMAIL,"|/usr/bin/pgp+batchmode+verbose =0 -fate
company |/usr/sbin/Mail -s'A Transaction from the Net'
company@unit.com");
print PGPMAIL "Name: $FORM{CLIENT}\n";
print PGPMAIL "Credit Card: $FORM{ccnumber}\n";
#. . .more information could be sent from here, ex: expiration date,
# list of products, etc.

# After this instruction, the whole PGPMAIL process executes and then
# terminates.
close(PGPMAIL);

#Tells the Client unit what happened
print "Content-type: text/html\n\n";
print "<HTML><BODY><H1>\n";
print "The Transaction has been transmitted securely.\n";
print "</H1></BODY></HTML>\n";

#Memory cleans up happens after the script ends.
```

Date. 96-04-23 11:26:50 EDT
From: http@mail2.digimark.net (HTTP User)
To: kinghill1@aol.com ------BEGIN PGP MESSAGE------
Version: 2.6 hEwClnFEqjelEmkBAf92ds4E4vmd40GZUdzb6iIvBjIrOU6zn/4DjnsSxokomi4p
g4FNSDxcCvZ7scoURAov7MFEQ7uovv+7b0nmtJcFpgAAAc01aFyUnfU9L7W2c0qP
AZOgWS8Fr45r0AeLq/Mv4FNUkEAAmKiNtab8xhYnYc+xVHjmY1AKZJlEEMUoy4aU
gCNmen/AMc3MDGjytAF1XSWX1YFprH9c7CjZ+RvOSbQ5RGjj9AY88YUmpDYsGekK
DxA51QLMB5TXKDw7K9mP3bc/vWI5pPdzPrHwxSuoLSLupECVD7IUqvvRSCNmcyxG
0QoGAF9HPosTrT7w8H6ksR5VwLIEVWZ5QTz8/J5983AqH+0Gf+zkM6ZaUh+a1mHC
Te24eNwXzq/Vc5vgyZBiWwOf5db3nUAg/KnryYmTqjBcdNpDi6ZHeDt3MajPvPW9
hBtDsuhRcFKQmQIED76mjvrkvMwUYf118MqoamJnclbUpPVeL4hpBugTjRznixwA
cGzjK5IDY2fT0cEAuJ43tbOthrSyX3Y9+Ctar3LR2s8JdB2Qsl+h1Axw1yDWaNdG
WXLGxuIdX6u4sVbZpkiDlIWdn/Dx/0FPL3iPWJmgogKTXb7d4IMTDHuzkBSAaKwL
fYI4SBlOCuHa5MCG72KcND+Ua4wc4zTMChOtrIVuH4kY9Eue5rRgFtDjmBH48nRH
fbV9yvbDP57sdjZT94k5vg==
=lPdL
-------END PGP MESSAGE-----

-------------------------Headers------------------------------------
From http@mail2.digimark.net   Tue Apr 23 11:26:36 1996
Return-Path: http@mail2.digimark.net
Received: from polyhymnia.digimark.net   (polyhymnia.digimark.net [198.77.86.8])
by emin22.mail.aol.com (8.6.12/8.6.12) with ESMTP id LAA29954 for
<kinghill1@aol.com>; Tue, 23 Apr 1996 11:26:35 -0400
Received: from urania.digimark.net   (urania.digimark.net [198.77.86.7]) by
polyhymnia.digimark.net (8.7.5/8.7.3) with ESMTP id LAA17714 for
<kinghill1@aol.com>; Tue, 23 Apr 1996 11:26:57 -0400 (EDT)
Received: (from http@localhost) by urania.digimark.net (8.7.5/8.7.3) id
LAA10417 for kinghill1@aol.com; Tue, 23 Apr 1996 11:26:30 -0400 (EDT)
Date: Tue, 23 Apr 1996 11:26:30 -0400 (EDT)
From: HTTP User <http@mail2.digimark.net>
Message-Id: <199604231526.LAA10417@urania.digimark.net>
To: kinghill1@aol.com
Subject: Invoice to Tom King from King of the Hill

APPENDIX A-continued 4-23-1996   America Online:Kinghill1   Page 1

Thank you Tom King for Ordering with us.

| | |
|---|---|
| Name: | Tom King |
| Address: | P.O. Box 304 |
| City/Town: | Addison |
| Province/State: | IL |
| Country: | USA |
| Postal/Zip Code: | 60101-0304 |
| Telephone: | 708-279-5550 |
| Fax: | 708-279-5572 |
| Email: | ThomasK797@aol.com |
| Credit Card: | Master Card |
| Card Numher: | 4444 4444 4444 4444 |
| Expiriation Date: | 01/97 |

| Order Code: | Short Description: | # of Unit(s): | Unit Price: |
|---|---|---|---|
| | #5 Teton Fly Reel | 1 | $175.00 |

SubTotal: $ 175.00
Freight to All other countries: $ 10.00
plus Illinois Taxe (6.5%): $ 12.03
Total: $ 197.03

Date: 23/4/96
Time: 11:26
Invoice: 51

Date: 96-04-23 11:26:42 EDT
From: http@mail2.digimark.net (HTTP User)
To: ThomasK797@aol.com Thank you Tom King for Ordering with us.

You are being billed for the following amount.

Total: $ 197.03

Date: 23/4/96
Time: 11:26
Invoice: 51

--------------------------Headers----------------------------------
From http@mail2.digimark.net   Tue Apr 23 11:26:35 1996
Return-Path: http@mail2.digimark.net
Received: from polyhymnia.digimark.net (polyhymnia.digimark.net [198.77.86.8])
by emin20.mail.aol.com (8.6.12/8.6.12) with ESMTP id LAA23538 for
<ThomasK797@aol.com>; Tue, 23 Apr 1996 11:26:35 -0400
Received: from urania.digimark.net (urania.digimark.net [198.77.86.7]) by
polyhymnia.digimark.net (8.7.5/8.7.3) with ESMTP id LA17712 for
<ThomasK797@aol.com>; Tue, 23 Apr 1996 11:26:57 -0400 (EDT)
Received: (from http@localhost) by urania.digimark.net (8.7.5/8.7.3) id
LAA10416 for ThomasK797@aol.com; Tue, 23 Apr 1996 11:26:29 -0400 (EDT)
Date: Tue, 23 Apr 1996 11:26:29 -0400 (EDT)
From: HTTP User <http@mail2.digimark.net>
Message-Id: <199604231526.LAA10416@urania.digimark.net>
To: ThomasK797@aol.com
Subject: Invoice to Tom King from King of the Hill 4-23-1996   America Online:ThomasK797   Page 1

What is claimed is:

1. In a networked communications system comprising a client unit, a secured host server, and a company subscriber unit, a method for providing secured commercial transactions via the networked communications system comprises the steps of:

provyiding a secured transaction path via the networked communications system between the client unit and the secured host server;

receiving encrypted commercial information transmitted via the secured transmission path by the client unit at the secured host server;

reencrypting substantially all of the once encrypted commercial information in response to the step of receiving encrypted commercial information; and forwarding the reencrypted commercial information via the communications network from the secured host server to the company subscriber unit.

2. The method as recited in claim 1, further comprising the steps of maintaining the encrypted commercial information solely in the dynamic memory of the secured host server and erasing the dynamic memory of the secured host server in response to the step of reencrypting the encrypted commercial information.

3. The method as recited in claim 2, wherein the step of providing a secured transmission path comprises the step of establishing a Secured Sockets Layer (SSL).

4. The method as recited in claim 1, wherein the step of reencrypting substantially all of the once encrypted commercial information further comprises the step of PGP encrypting the encrypted commercial information.

5. The method as recited in claim 3, further comprising the step of presenting the client unit with an order form having information fields and utilizing the secured sockets layer to encrypt commercial information entered into the information fields.

6. In a networked communications system comprising a client unit, a secured host server, and a company subscriber unit, a method for providing secured commercial transactions via the networked communications system comprising the steps of:

providing a secured sockets layer transmission path via the networked communications system between the client unit and the secured host server;

presenting the client unit with an order form in which commercial information is to be entered via the secured socket layer transmission path;

receiving the commercial information transmitted via the secured sockets layer transmission path by the client unit at the secured host server;

maintaining the commercial information solely in the dynamic memory of the secured host server;

PGP encrypting the commercial information in response to the step of receiving the commercial information;

erasing the dynamic memory of the secured host server in response to the step of PGP encrypting the commercial information; and forwarding the PGP encrypted commercial information via the communications network from the secured host server to the company subscriber unit.

7. The method as recited in claim 6, wherein the step of forwarding the PGP encrypted commercial information includes the step of:

utilizing unsecured commercial electronic mail.

8. The method as recited in claim 1 wherein the step of forwarding the re-encrypted commercial information includes the step of utilizing unsecured commercial electronic mail.

* * * * *